W. F. BRABROOK.
Harvester.
No. 67,490.  Patented Aug. 6, 1867.
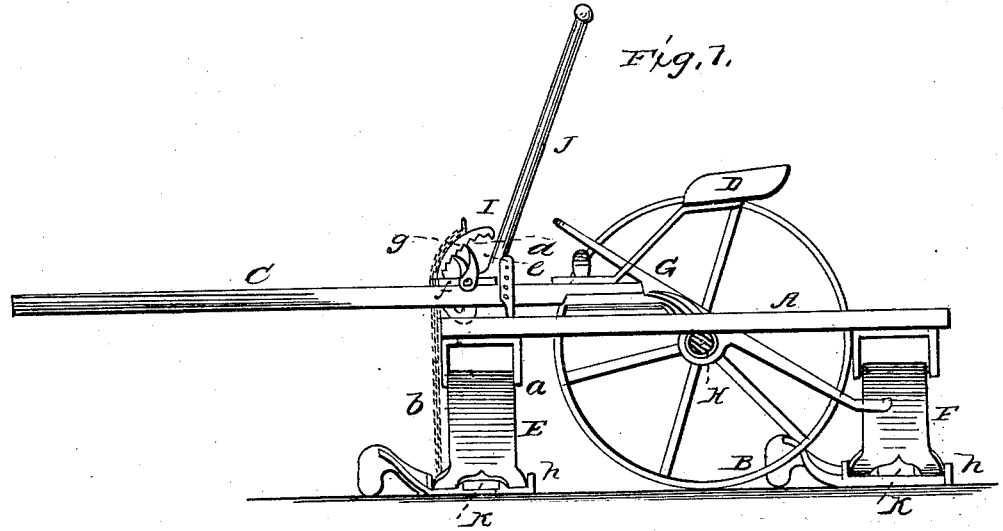
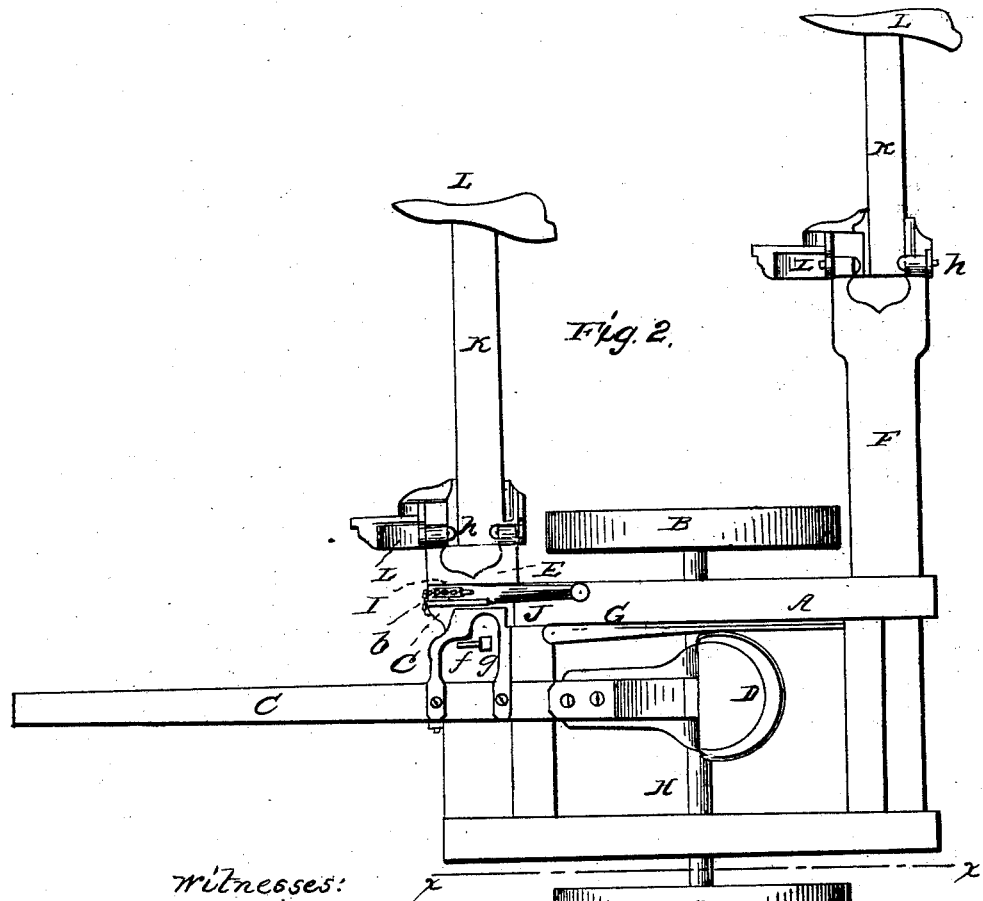

United States Patent Office.

WILLIAM F. BRABROOK, OF SOUTH HARDWICK, VERMONT.

Letters Patent No. 67,490, dated August 6, 1867.

IMPROVEMENT IN HARVESTERS.

The Schedule referred to in these Letters Patent and making part of the same.

TO ALL WHOM IT MAY CONCERN.

Be it known that I, WILLIAM F. BRABROOK, of South Hardwick, in the county of Caledonia, and State of Vermont, have invented a new and useful Improvement in Reaping and Mowing Machines; and I do hereby declare that the following is a full, clear, and exact description thereof, which will enable those skilled in the art to make and use the same, reference being had to the accompanying drawings, forming part of this specification, in which—

Figure 1 is a side view of my invention.

Figure 2 a plan or top view of the same.

Similar letters of reference indicate corresponding parts.

This invention consists in attaching two sickles to the main frame of a reaping and mowing machine, in such a manner that the machine may be made to cut much nearer to stumps, stones, and other obstructions than usual, and allowed to conform to the inequalities of the surface of the ground much more perfectly than hitherto.

A represents the main frame of a mowing or reaping machine, supported on two wheels, B B, and having the usual draught-pole C attached, and also a driver's seat, D. To the front end of the main frame A there is attached, by a joint, $a$, a bar, E, said bar being attached to the left-hand side of the machine. To the rear end of the frame A, and at the same side, there is attached a similar bar, F, to which a foot-lever, G, is connected, the latter having its fulcrum on the axle H of the wheels B B. The front bar E is connected by a chain, $b$, with a segment, I, at the lower end of a lever, J, connected to a bracket, $c$, on the draught-pole C. The segment I has ratchet-teeth, $d$, in its inner edge, into which a pawl, $e$, catches, said pawl being on a shaft, $f$, fitted in the bracket $c$, and having a foot-lever, $g$, on its inner end. To the outer end of the bars E F there are attached, by joints $h$, sickle-bars K K, provided with the usual fingers, and having the ordinary reciprocating sickles applied to them. At the outer and inner ends of the sickle-bars K K shoes L are attached. The front sickle-bar, K is longer than the rear one, and the bar E, to which the front sickle-bar is attached, is considerably shorter than the bar F to which the rear sickle-bar K is attached, the front sickle-bar projecting rather farther outward than the inner end of the rear sickle-bar, as shown clearly in fig. 2. By this arrangement it will be seen that the cuts of the two sickles overlap, and no "comb" or standing grass or grain will be left, a swath being cut equal in width to the space included between the inner end of the front sickle-bar K and the outer end of the rear sickle-bar.

The two sickle-bars thus applied admit of the grass or grain being cut quite close to stumps, stones, and other obstructions, for either sickle-bar may be raised, as occasion may require, with the greatest facility. If, for instance, a stump is within the path of the front sickle, the former is raised, and the bar F at the rear of the machine will pass over the obstructions, and if a stump or obstruction is in line with the rear sickle-bar K the front sickle-bar will escape it. By this arrangement the cutting device is allowed to conform perfectly to the inequalities of the surface of the ground far more so than if one sickle-bar only were used, and the expense of construction will not be materially augmented.

Having thus described my invention, what I claim as new, and desire to secure by Letters Patent, is—

The construction and arrangement of the jointed bars E F, sickles K K of unequal length, foot-lever G, chain $b$, toothed segment I, lever J, pawl $e$ on the lever-shaft $f$ in the bracket $c$, substantially as described for the purpose specified.

WILLIAM F. BRABROOK.

Witnesses:
ADOLPHUS HOLTON,
H. B. BUNDY.